United States Patent
Norrga et al.

(10) Patent No.: US 8,942,014 B2
(45) Date of Patent: Jan. 27, 2015

(54) CONVERTER CELL FOR CASCADED CONVERTERS AND A CONTROL SYSTEM AND METHOD FOR OPERATING A CONVERTER CELL

(75) Inventors: Staffan Norrga, Stockholm (SE); Frans Dijkhuizen, Skultuna (SE); Tomas Jonsson, Vasteras (SE); Thomas Setz, Veltheim (CH)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/619,047

(22) Filed: Sep. 14, 2012

(65) Prior Publication Data

US 2013/0063995 A1  Mar. 14, 2013

Related U.S. Application Data

(63) Continuation of application No. PCT/EP2010/053576, filed on Mar. 18, 2010.

(51) Int. Cl.
*H02M 7/10* (2006.01)
*H02M 7/797* (2006.01)
*H02M 1/32* (2007.01)
(Continued)

(52) U.S. Cl.
CPC .............. *H02M 7/797* (2013.01); *H02M 1/32* (2013.01); *H02M 7/49* (2013.01); *H02M 2007/4835* (2013.01); *H02M 2001/325* (2013.01)
USPC .......................................................... 363/68

(58) Field of Classification Search
USPC ............. 363/65–72, 51, 54, 56.02, 56.04, 58, 363/127, 128; 323/207
See application file for complete search history.

(56) References Cited

U.S. PATENT DOCUMENTS

| | | | | | |
|---|---|---|---|---|---|
| 4,126,819 | A | * | 11/1978 | Stobbe et al. | 318/810 |
| 6,256,215 | B1 | * | 7/2001 | Barrett et al. | 363/132 |

(Continued)

FOREIGN PATENT DOCUMENTS

| | | | | |
|---|---|---|---|---|
| DE | 10333798 | * | 2/2005 | H02M 7/48 |
| DE | 10333798 | A1 | 2/2005 | |

(Continued)

OTHER PUBLICATIONS

International Search Report & Written Opinion of the International Searching Authority; Application No. PCT/EP2010/053576; Issued: Dec. 16, 2010; Mailing Date: Jan. 10, 2011; 15 pages.

(Continued)

*Primary Examiner* — Monica Lewis
*Assistant Examiner* — Kyle J Moody
(74) *Attorney, Agent, or Firm* — St. Onge Steward Johnston & Reens LLC

(57) ABSTRACT

A cascaded electric power converter and a method of operating a cascaded electric power converter are disclosed. The cascaded converter includes: a converter cell including a cell capacitor and at least one phase leg having at least two electric valves, the at least one phase leg being connected in parallel to the cell capacitor; and a control system for controlling the switching of the electric valves of the at least one phase leg. The control system is configured to, upon detection of a need to by-pass the converter cell, control the switching of the electric valves in a manner so that the cell capacitor is short circuited via a phase leg, so as to obtain a current surge through the phase leg, thereby creating a permanent current path through the converter cell.

20 Claims, 11 Drawing Sheets

(51) Int. Cl.
  *H02M 7/49* (2007.01)
  *H02M 7/483* (2007.01)

(56) References Cited

U.S. PATENT DOCUMENTS

| | | | |
|---|---|---|---|
| 6,876,556 B2 * | 4/2005 | Zhu et al. | 363/17 |
| 7,835,166 B2 * | 11/2010 | Hiller | 363/132 |
| 8,345,457 B2 * | 1/2013 | Asplund et al. | 363/132 |
| 2008/0232145 A1 * | 9/2008 | Hiller et al. | 363/56.01 |
| 2011/0085363 A1 * | 4/2011 | Gupta et al. | 363/131 |
| 2013/0176752 A1 * | 7/2013 | Schelenz et al. | 363/17 |

FOREIGN PATENT DOCUMENTS

| | | |
|---|---|---|
| WO | 2007023064 A1 | 3/2007 |
| WO | 2007095873 A1 | 8/2007 |

OTHER PUBLICATIONS

Ding, et al.; "New Technologies of Voltage Source Converter (VSC) for HVDC Transmission System Based on VSC", 2008 IEEE; pp. 1-8.

* cited by examiner

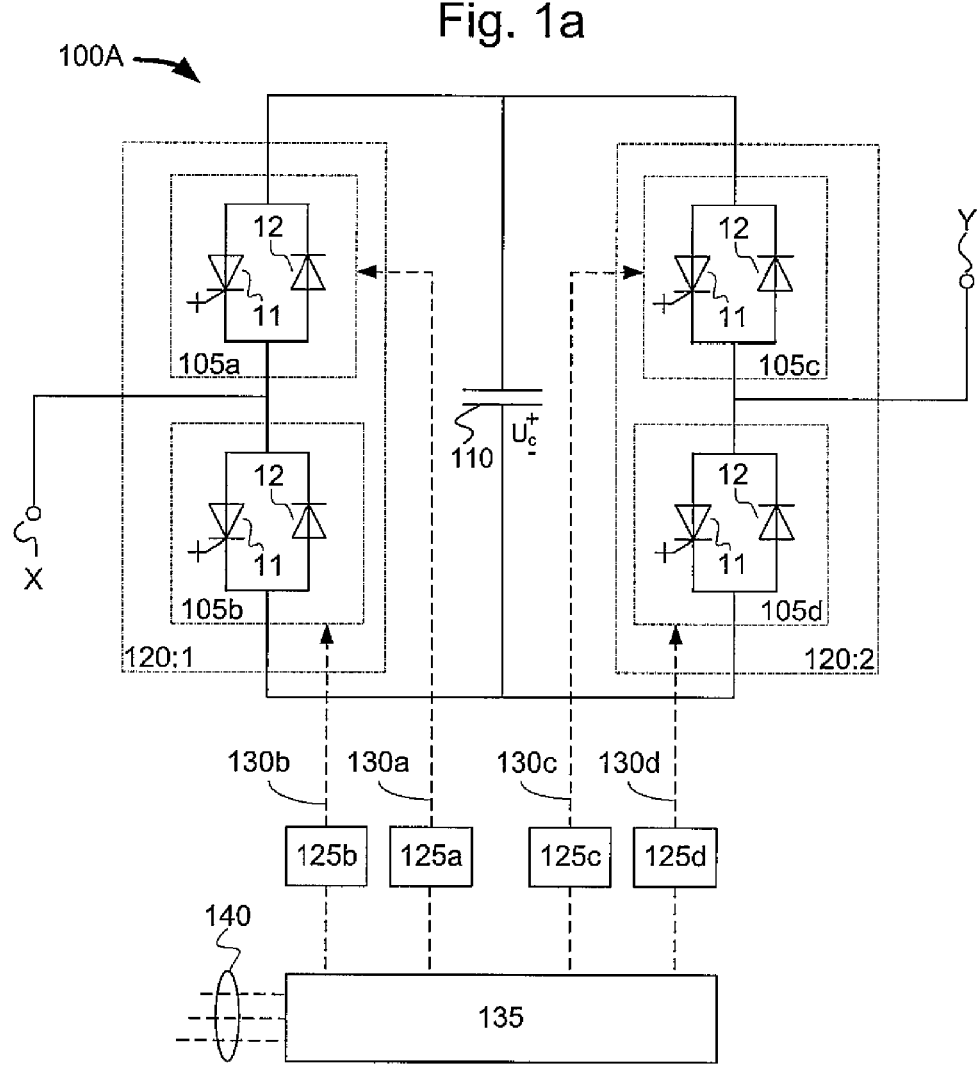

Fig. 1b
Fig. 1c
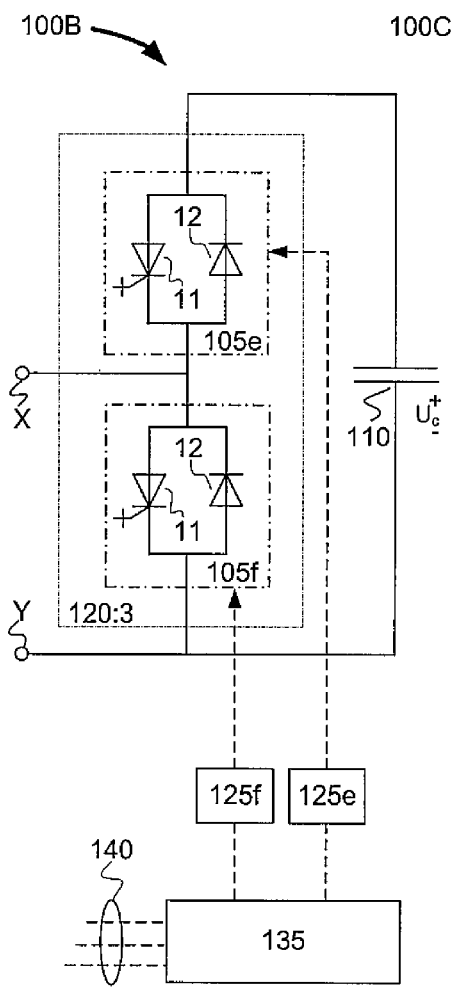
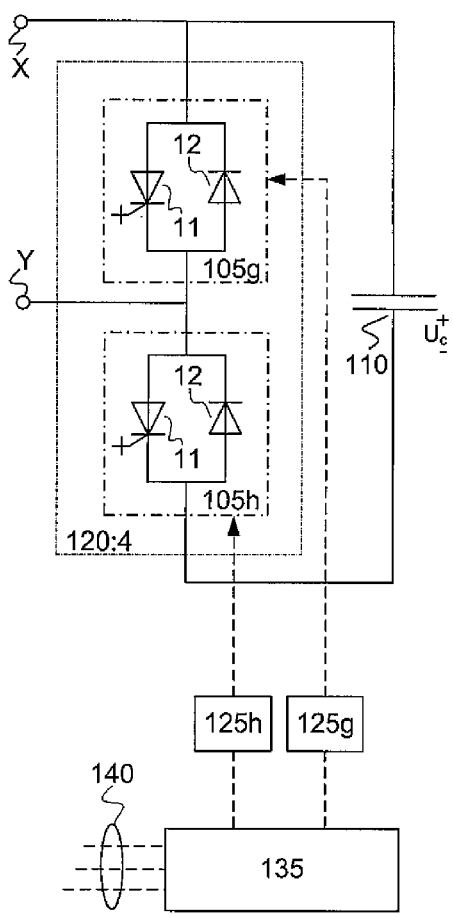

200A

200B

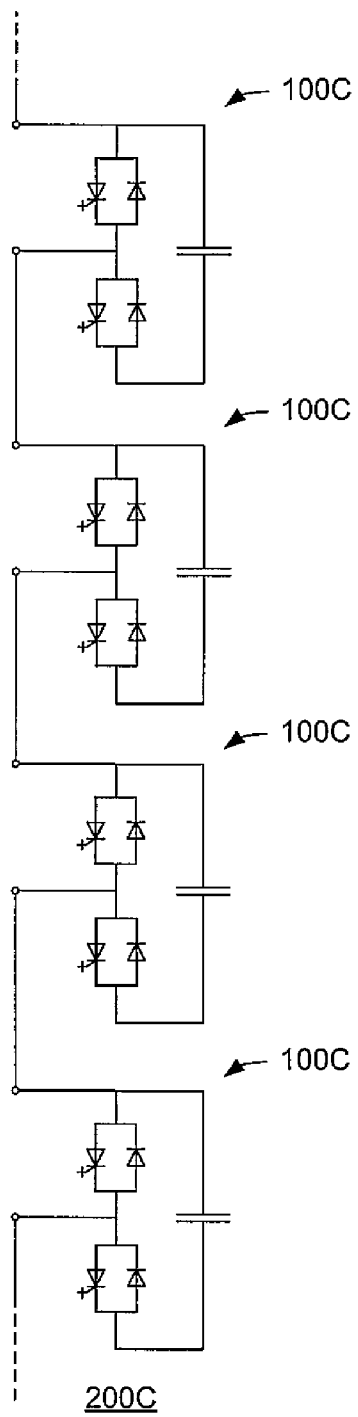
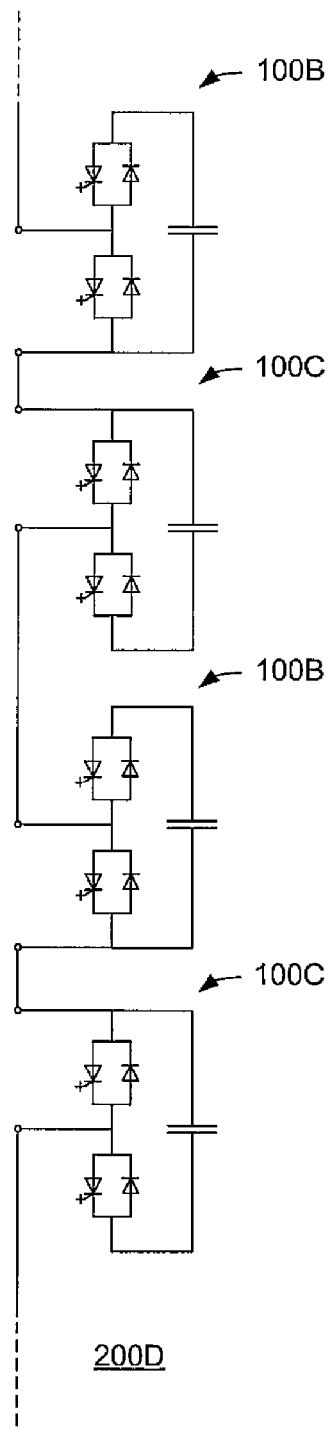
Fig. 2c
Fig. 2d

100A

100A

CONVERTER CELL FOR CASCADED CONVERTERS AND A CONTROL SYSTEM AND METHOD FOR OPERATING A CONVERTER CELL

CROSS-REFERENCE TO RELATED APPLICATIONS

The present application is a continuation of pending International patent application PCT/EP2010/053576 filed on Mar. 18, 2010 which designates the United States and the content of which is incorporated herein by reference.

FIELD OF THE INVENTION

The present invention relates to the field of power electronic converters, and in particular to cascaded power electronic converters.

BACKGROUND OF THE INVENTION

Power electronic converters including semiconductor valves are widely used to change the character of electrical energy by means of controlling the voltage, current and/or frequency. Power electronic converters are for example increasingly used in power transmission applications, such as in HVDC transmission systems or in static VAR compensation systems for utility or industry grids.

In such applications, it is important that the down time of the converters is reduced to a minimum, since failure of a converter may result in power outages, which can be costly for society as well as for the power provider. Despite efforts to improve the life time and cycling capability of electronic components, fault free operation of such components cannot be guaranteed. Hence, redundancy is an important concept when designing power transmission systems.

Multi-level power electronic converters having a plurality of cells which are series connected in a cascade fashion have been proposed in DE 101 03 031, as well as in "*A multilevel Voltage-Source Inverter with Separate DC Sources for Static Var Generation*", Fang Zheng Peng et al., *IEEE IAS Conf* 1995 *Proc*. Cascaded converters provide a plurality of discrete converter output voltage levels, thereby facilitating synthesizing of a sinusoidal voltage waveform. Moreover, such cascaded converters inherently provide redundancy at low expense in that the terminals of the faulty cell can be short-circuited and the faulty cell by-passed, while the remaining cells can continue to operate normally. Thus, despite a faulty cell, the remaining cells can continue to deliver the desired voltage as long as the remaining number of cells is sufficient.

Different mechanisms for short-circuiting the terminals of semiconductor devices have been proposed, see for example WO 2007/023064, wherein a protection component is connected in parallel to a rectifier circuit, in order to provide short-circuiting of the terminals of the rectifier circuit in case of a fault; or WO 2007/095873, wherein a pyrotechnical/mechanical element is used in a short-circuiting operation. These mechanisms require additional hardware, and thus increase the cost and volume of the semiconductor devices.

In "Fault-Tolerant Transformerless Power Flow Controller Based-on ETO Light Converter", Wenchao Song et al., Twenty-Third Annual IEEE Applied Power Electronics Conference and Exposition, 2008, a cascaded multilevel converter having H-bridge building block cells is disclosed. It is suggested that when a top/bottom switch of the H-bridge is failed short, another top/bottom switch is turned on, while the two complementary switches are turned off, thus making the H-bridge building block cell enter a shorted state. This method of obtaining an AC short circuit between the cell terminals can be implemented without any additional hardware. However, the mechanism requires that power is provided to the gate drive unit of another top/bottom switch in order to keep this switch turned on. In case the cell is shorted out completely, no DC voltage will be available to the cell, and the power required to maintain another top/bottom switch in the turned on state cannot easily be provided within the cell.

SUMMARY OF THE INVENTION

An object of the present invention is to provide an alternative way of by-passing a fault converter cell in a cascaded power converter.

One embodiment provides a cascaded electric power converter comprising: a converter cell including a cell capacitor and at least one phase leg having at least two electric valves, where the at least one phase leg is connected in parallel to the cell capacitor. The cascaded electric power converter further comprises a control system for controlling the switching of the electric valves of the at least one phase leg. The control system is configured to, upon detection of a need to by-pass the converter cell, control the switching of the electric valves of the converter cell in a manner so that the cell capacitor is short circuited via a phase leg, so as to obtain a current surge through the phase leg, thereby creating a permanent current path through the converter cell.

A method of by-passing a converter cell in a cascaded electric power converter is also provided. The method is applicable to a converter cell having a cell capacitor and at least one phase leg connected in parallel to the cell capacitor, wherein a phase leg has at least two series connected electric valves. The method comprises controlling the switching of the electric valves in a manner so that the cell capacitor is short circuited via a phase leg, so as to obtain a current surge through the phase leg, thereby creating a permanent current path through the phase leg.

By the cascaded converter and method of by-passing a converter cell is achieved that a faulty converter cell can be by-passed even without providing power to any gate drive unit in the cell. Furthermore, the by-passing mechanism provided by the cascaded converter and the method of by-passing a converter cell can be achieved without the use of any additional hardware. Thus, a simple and space efficient way of providing by-passing possibilities to a cascaded converter can be achieved by the present technology.

In one embodiment, the converter cell further comprises a reactor connected in series between the cell capacitor and a phase leg, in order to limit the peak current upon short-circuiting of the cell capacitor. Hereby, a too rapid heating of the components of the phase leg 120 upon short-circuiting of the cell capacitor can be avoided, thereby reducing the risk of undesired damage. A clamping circuit connected so as to limit the voltage across the valves during turn-off can furthermore be provided in this embodiment.

The converter cell may be a full-bridge converter cell comprising two phase legs, or a half-bridge converter cell comprising one phase leg. When the converter cell is a full-bridge converter cell, the converter cell may further comprise: a first and second power supply units configured to supply power to the switching of the electric valves, wherein the first power supply unit is configured to supply power to the switching of the electric valves of a first phase leg and the second power supply unit is configured to supply power to the switching of the electric valves of the second phase leg, and wherein the first and second power supply units are independent of each other. Hereby is achieved that it can be ensured that the valves of at least one phase leg can be controlled to short circuit the cell capacitor, if need arises, even if one of the power supplies fails.

In one embodiment, the control system is configured to receive at least one status signal indicative of the status of the converter cell. Upon detection of a need to by-pass the converter cell and in dependence of at least one received status signal, the control system is further configured to select at least one electric valve to be turned on, wherein the selection is performed in a manner so that the turning on of the selected electric valve(s) will create a path through a phase leg by which the cell capacitor will be short-circuited; and to generate a signal to the selected electric valve(s) to switch into a turned on state in order to short circuit the cell capacitor.

In another embodiment, the control system is configured to, upon detection of a need to by-pass the converter cell, generate a signal to a pre-determined set of electric valve(s) which, when turned on, will create a path through a phase leg by which the cell capacitor will be short-circuited.

A cascaded electronic power converter can comprise any suitable number of converter cells arranged in a cascaded fashion. The control system could be configured to, upon detection of a need to by-pass a particular converter cell, control the switching of the electric valves of the particular converter cell in a manner so that the cell capacitor of the particular converter cell is short circuited via a phase leg.

The invention also relates to an HVDC station comprising the cascaded electric power converter, as well as to an SVC station comprising the cascaded electric power converter, and to a power transmission system comprising the cascaded electric power converter (for example in an HVDC station or an SVC station).

Further aspects of the invention are set out in the following detailed description and in the accompanying claims.

BRIEF DESCRIPTION OF THE DRAWINGS

FIG. 1A shows an example of a full-bridge converter cell;
FIG. 1B shows an example of a half-bridge converter cell;
FIG. 1C shows another example of a half-bridge converter cell
FIG. 2B-2D show different examples of cascades of half-bridge converter cells.

DETAILED DESCRIPTION OF THE INVENTION

Figure 3A:
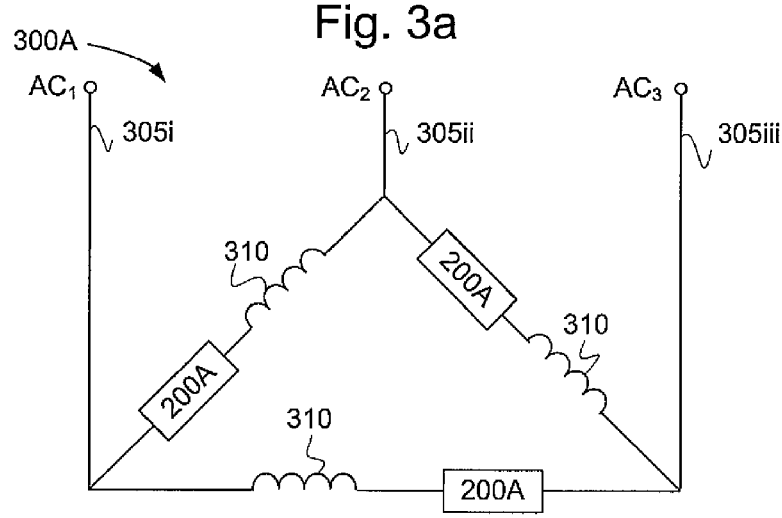
FIG. 3A shows an example of a three-phase cascaded converter suitable for use in for example a static VAR compensation system.

FIG. 1a illustrates an example of an embodiment of a converter cell 100A, which could for example be used in a cascade converter as shown in FIG. 3a. Converter cell 100A comprises four electric valves 105a-d which are configured to be able to conduct current in both directions and block voltage in one direction. An electric valve 105a-d of FIG. 1a includes a unidirectional switch 11, or switch 11 for short, and an anti-parallel diode 12, where the unidirectional switch 11 can be controlled to switch off, as well as to switch on. The four valves 105a-d are arranged in a full-bridge configuration (also referred to as an H-bridge configuration) comprising two phase legs: Phase leg 120:1, wherein valve 105a and valve 105b are series connected, and phase leg 120:2, wherein valves 105c and valve 105d are series connected. Within a phase leg 120:1 or 120:2, the valves are connected to be able to block voltage in the same direction. The two phase legs 120:1 and 120:2 are connected in parallel with a cell capacitor 110 in a manner so that the two phase legs 120:1 and 120:2 are capable of blocking voltage from the same end of the cell capacitor 110. The voltage across the cell capacitor 110 is here denoted Uc.

Cell terminals X and Y are provided at the midpoint of phase leg 120:1 and 120:2, respectively, i.e. at a point between the two valves 105a & 105b or 105c & 105d. The voltage between the terminals X and Y, denoted Uxy, can take different values, depending on which valves are switched on and switched off according to table 1a.

TABLE 1a

Switching states of converter cell 100A of FIG. 1a.

| | Switching state | | |
|---|---|---|---|
| | I | II | III |
| Uxy | 0 | −Uc | +Uc |
| Valve 105a | ON/OFF | OFF | ON |
| Valve 105b | OFF/ON | ON | OFF |
| Valve 105c | ON/OFF | ON | OFF |
| Valve 105d | OFF/ON | OFF | ON |

Converter cell 100A of FIG. 1a is further provided with four gate drive units 125a-d, configured to deliver switching signals 130a-d to valves 105a-d, respectively, in a known manner. The gate drive units 125a-d are in turn responsively connected to a control system 135, for example by means of optical cables. Gate drive units 125a-d could furthermore be connected to the cell capacitor 110A as a power source, if desired.

In FIG. 1b, an embodiment is shown of another type of converter cell 100B, wherein two electric valves 105e and 105f form a phase leg 120:3, which is connected in parallel with a cell capacitor 110 in a half-bridge configuration. A cell terminal X is provided at the midpoint of phase leg 120:3, i.e. at a point between the two valves 105e and 105f, while a cell terminal Y is provided at a point, between the cell capacitor 110 and the phase leg 120:3, towards which the unidirectional switches 11 of valves 105e and 105f can conduct current. In FIG. 1c, an equivalent converter cell 100C having a phase leg 120:4 is shown. In converter cell 100C, a terminal X is provided at a point, between the cell capacitor 110 and the phase leg 120:4, towards which the anti-parallel diodes 12 of valves 105e and 105f can conduct current, while a terminal Y is provided at the midpoint of phase leg 120:4. The converter cell 100B and 100C can each be controlled, by means of gate drive units 125e & 125f and gate drive units 125g & 125h, respectively, so that the voltage Uxy between terminals X and Y take one of two different values in accordance with tables 1b and 1c, respectively.

TABLE 1b

Switching states of converter cell 100B of FIG. 1b.

| | Switching state | |
|---|---|---|
| | I | II |
| Uxy | 0 | Uc |
| Valve 105e | OFF | ON |
| Valve 105f | ON | OFF |

TABLE 1c

Switching states of converter cell 100C of FIG. 1c.

| | Switching state | |
|---|---|---|
| | I | II |
| Uxy | 0 | Uc |
| Valve 105g | ON | OFF |
| Valve 105h | OFF | ON |

When referring to any one (or all of) the phase legs 120:1, 120:2, 120:3 and 120:4, the common term phase leg 120 will be used. Similarly, when referring to any one of the valves 105a, 105b, 105c, 105d, 105e, 105f, 105g and 105h, the common term valve 105 will be used; when referring to any one of the converter cells 100A, 100B and 100C, the common term converter cell 100 will be used, and so forth.

Regardless of converter cell configuration, a phase leg can have the same basic topology. For example, the phase legs 120 shown in FIGS. 1a-c each have two valves 105, each valve connecting one of the DC rails to the midpoint of the phase leg 120.

An electric valve 105 of FIGS. 1a-c is shown to include a unidirectional switch 11 and an anti-parallel diode 12, where the unidirectional switch 11 can be controlled to switch off, as well as to switch on. In some implementations, the anti-parallel diode 12 could be integrated in the switch 11, the switch being reverse conducting. An example of such reverse conducting switch, which on its own could provide the functionality of a valve 105, is the reverse conducting integrated gate-commutated thyristor (IGCT). Furthermore, an electric valve 105 could comprise more than one switches 11, connected in series and/or in parallel and arranged to switch simultaneously, and/or more than one anti-parallel rectifying elements 12.

A gate drive unit 125 of a converter cell 100 is connected to a control system 135, which is configured to control the switching of the valves 105 of the converter cell 100 in order to alternatingly arrive at the different switching states of the converter cell 100 (cf. table 1a, 1b or 1c). In other words, the valves 105 of a converter cell 100 are responsively connected to the control system 135, via gate drive units 125.

Control system 135 of FIGS. 1a-c is typically configured to receive a set of status signals 140, indicative of the status of the converter cell 100A, 100B or 100C, respectively, based on which the control of the converter cell 100 is performed.

In order to avoid short-circuiting of the cell capacitor 110, a control system 135 is often equipped with an interlock system which prevents the two unidirectional switches 11 of a phase leg 120 to be switched on at the same time. Short-circuiting of cell capacitor 110 when cell capacitor 110 is charged to its operating voltage would typically cause irreparable damage to the unidirectional switches 11 of the phase leg 120, thus rendering the converter cell 100 inoperable. When switching between different switching states, a short time period wherein both valves of a phase leg 120 are switched off is therefore often employed in order to avoid such damage.

Figure 2A:
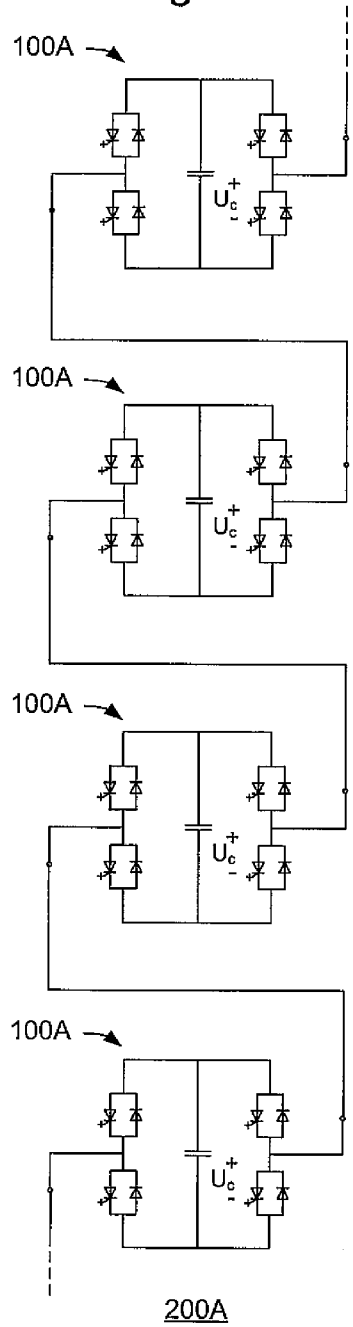
FIG. 2A shows an example of a cascade of full-bridge converter cells.
Figure 2B:
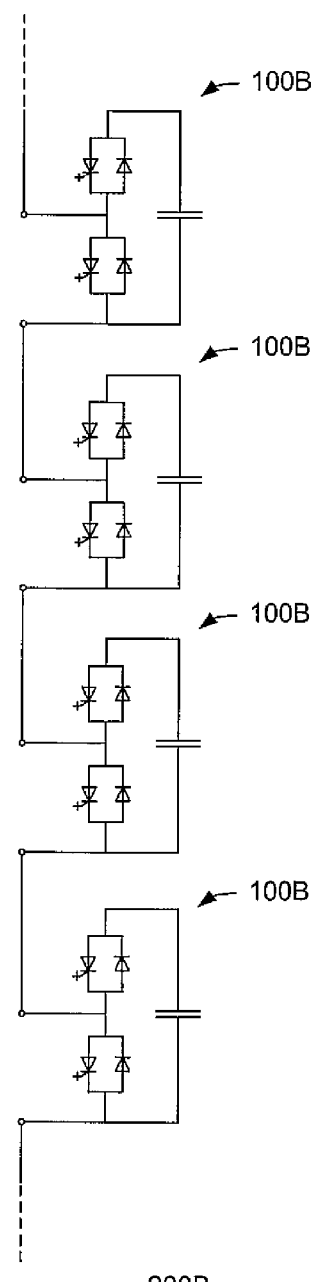

A plurality of converter cells 100 can be connected in series to provide a cascade, the output voltage of which can take a plurality of discrete values. Examples of cascades of converter cells 100 are shown in FIGS. 2a-d. In FIG. 2a, a full-bridge cascade 200A of full-bridge converter cells 100A is shown. FIG. 2b shows a half-bridge cascade 200B of half-bridge converter cells 100B; FIG. 2c shows an equivalent half-bridge cascade 200C of half-bridge converter cells 100C; and FIG. 2d shows a half-bridge cascade 200D wherein half-bridge converter cells 100B and 100C are alternately provided. A cascade 200 could include any number M of converter cells 100, where M≥2, of which four are shown in FIGS. 2a-2d, respectively.

Converter cell cascades 200 can be used in cascaded converters, also known as chain-link converters. In FIG. 3a, an example of an embodiment of a full-bridge cascaded power electronic converter 300A is shown. Cascaded converter 300A of FIG. 3a is a three phase, Δ-connected converter having three phase terminals 305i, 305ii and 305iii. Cascaded converter 300A comprises one full-bridge cascade 200A, in series connection with a reactor 310, per phase. Full-bridge cascades 200A could alternatively be used in a three phase wye-connected converter, or in a cascaded converter having a different number of phases. A cascaded converter comprising full-bridge converter cells 100A could for example be used in a static VAR compensation (SVC) system.

Figure 3B:
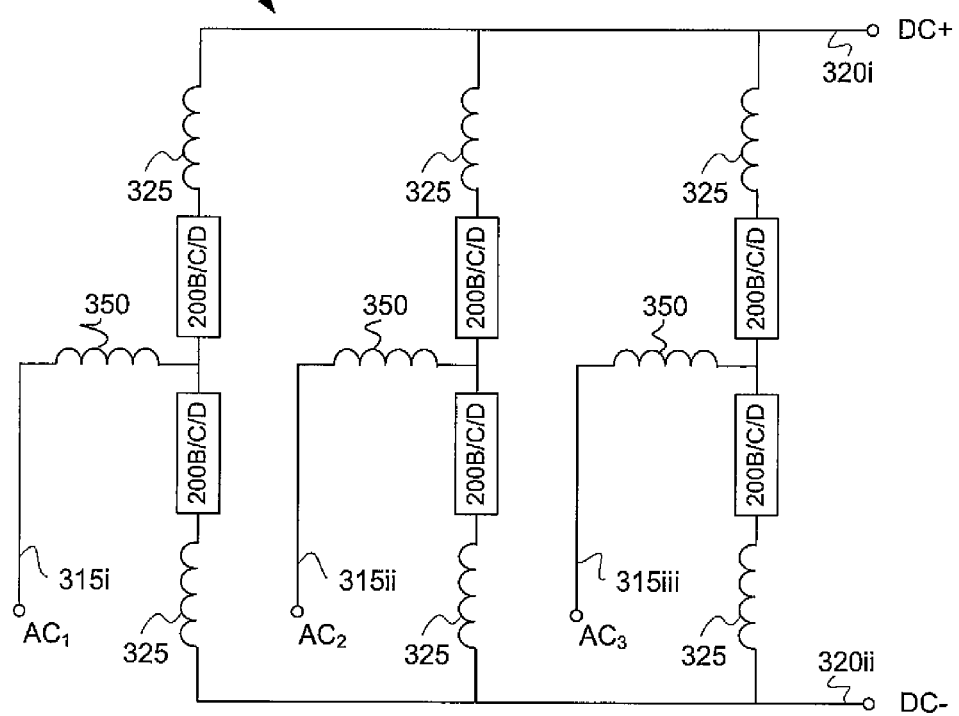
FIG. 3B shows an example of a three phase cascaded AC/DC converter suitable for use in for example an HVDC system.

In FIG. 3b, an example of an embodiment of a half-bridge cascaded power electronic converter 300B is shown. Cascaded converter 300B of FIG. 3b is a three-phase AC/DC converter arranged to rectify a three phase AC voltage, or to invert a DC voltage into a three phase AC voltage. Cascaded converter 300B comprises six cascades 200 of half-bridge converter cells (for example, six cascades 200B, 200C or 200D) which are connected in series two by two, and where the midpoint of a first series-connected cascade pair is connected to a first AC phase 315i, the midpoint of a second series-connected cascade pair is connected to a second AC phase 315ii etc. The end points of the respective series connected cascade pairs are connected to DC terminals 320i and 320ii, to which a DC power source or network may be connected. The half-bridge cascades 200B/C/D in converter 300B of FIG. 3b is each series connected with a reactor 325, and reactors 350 are connected in series with each AC phase connection point 315. Half-bridge cascades 200B, 200C, 200D could alternatively be used in an AC/DC converter 300B having a different number of phases. An AC/DC converter comprising half-bridge cascades 200B/C/D could for example be used in an High Voltage Direct Current (HVDC) station.

Faulty operation of a converter cell 100 could for example be caused by a short-circuited switch 11 of a valve 105; by a faulty gate drive unit 125, which is incapable of turning on and/or off a valve 105; by a valve 105 having failed into an open circuit, etc.

As mentioned above, an advantage of using cascaded converters 300, rather than traditional two level converters, is that redundancy may be efficiently catered for, either in that additional, "spare", converter cells 100 are provided in a cascade 200, or in that, in case of failure of a converter cell 100, the converter 300 could be arranged to operate at a lower voltage with the remaining converter cells 100. However, in order for the remaining converter cells 100 to continue in operation when one or more of the converter cells 100 of a cascade 200 has failed, the faulty converter cell(s) 100 should advantageously be by-passed. If a faulty converter cell 100 is not by-passed, it may jeopardize the operation of the cascaded converter 300. The faulty converter cell 100 may for instance take up a too high voltage, which may lead to a dielectric breakdown with potentially devastating consequences.

According to the present technology, the by-passing of a faulty converter cell 100 can be achieved by short-circuiting the cell capacitor 110 through a phase leg 120, thereby using the energy stored in the cell capacitor 110 to create a permanent short circuit through the phase leg 120. In all known applications of converter technology, measures have been taken in order to ensure that such short-circuiting of a charged cell capacitor 110 is avoided, since the current surge created by such short-circuiting has destructive powers. The present technology, on the other hand, uses the destructive powers of the energy stored in the capacitor 110 in a constructive way, to create a desired permanent current path through an entire phase leg 120 of a faulty converter cell 100. By allowing the current surge to flow through a phase leg 120, the switches 11 of the phase leg will be overloaded in terms of current, and the entire phase leg will be permanently short circuited. The permanent current path thus created will form a by-pass path which acts to by-pass the faulty converter cell 100.

The method of short circuiting the terminals of a faulty converter cell 100 by short-circuiting the cell capacitor 110 through a phase leg 120 is applicable to converter cells 100 having switches 11 which will fail into a short circuit, rather than into an open circuit. High power semiconductor devices in disc type package typically exhibit this failure behaviour. An example of semiconductor device in a disc type package configuration is provided in EP0588026. In semiconducting devices in disc type package, a semiconducting wafer is compressed between two plates (typically molybdenum plates) forming the terminals of the semiconducting device. Furthermore, semiconducting devices in disc type package often do not contain any carbon, wherefore the risk of explosion is low even for strong current surges. Examples of suitable switches 11 which can be made in a disc type package configuration are Integrated Gate-Commutated Thyristors (IGCTs), Gate Turn-Off Thyristors (GTOs) Emitter Turn-Off thyristors (ETOs) and reverse conducting IGCTs. Other switches 11 which fail into a short circuit may also be used.

Figure 4A:
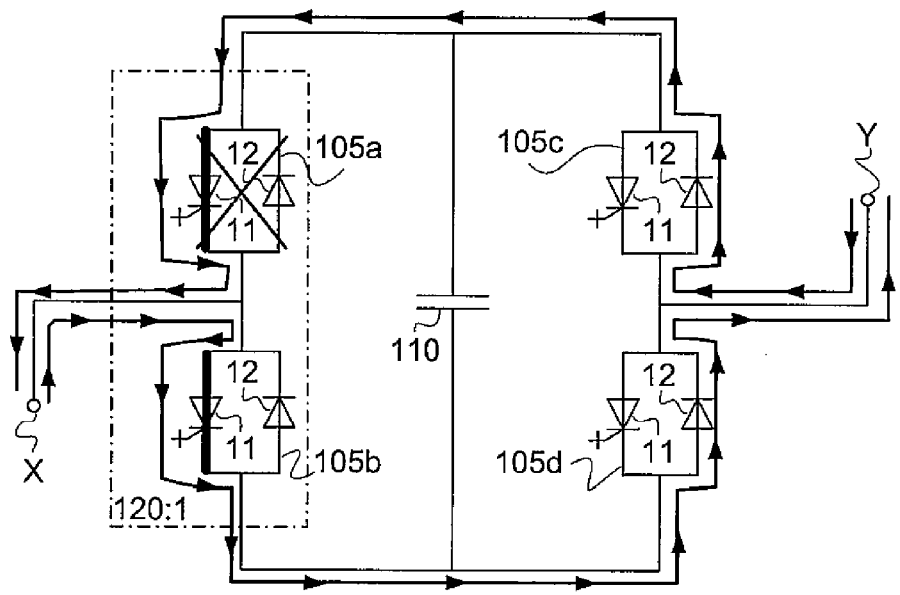
FIG. 4A-4B illustrate the effects of short-circuiting the cell capacitor through one of the cell phase legs of a full-bridge converter cell.

In FIGS. 4a-d, illustrations are shown of different converter cells 100 having a failed valve 105 and to which the above described short-circuiting operation has been performed. FIG. 4a illustrates a full-bridge converter cell 100A where the valve 105a was detected to be faulty, the fault indicated in the figure by a cross over the valve 105a. The need for short-circuiting of the terminals X and Y of the converter cell 100A was detected, and the valves 105a and 105b were turned on at the same time so that a current discharge from the cell capacitor 110 was allowed to flow through the phase leg 120:1, thus causing the unidirectional switches 11 of valves 105a and 105b to fail into a short circuit, indicated in FIG. 4a by the bold lines through these unidirectional switches 11. By short-circuiting the unidirectional switches 11 of the phase leg 120:1, a permanent current path has been created between the cell terminals X and Y through the converter cell 100A, as indicated by the arrowed path in FIG. 4a. Current can pass from terminal X to terminal Y through short circuited unidirectional switch 11 of valve 105b, and through diode 12 of valve 105d. From terminal Y to terminal X, current can pass through diode 12 of valve 105c and short-circuited unidirectional switch 11 of valve 105a. Since the switches 11 of valves 105a and 105b have permanently failed into short circuit, and the diodes 12 of valves 105c and 105d are passive elements, the current path through the converter cell 100A is permanent and independent of any power supply to the converter cell 100A.

Figure 4B:
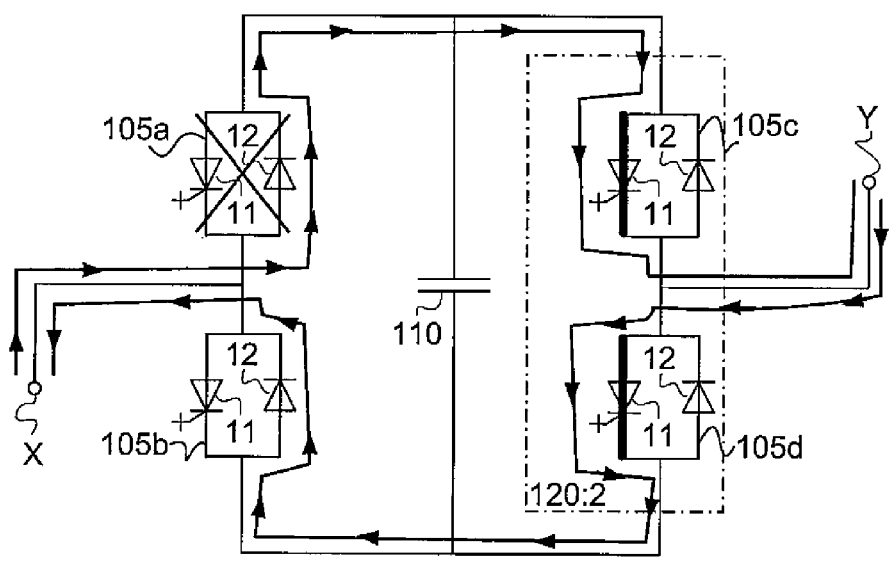

FIG. 4b illustrates the result of an alternative short-circuiting operation on a converter cell 100A wherein a faulty valve 105a has similarly been detected. In this case, the valves 105c and 105d of phase leg 120:2, i.e. the opposite phase leg 120 to that wherein a faulty valve 105a was detected, were turned on at the same time so that a current discharge from the cell capacitor 110 was allowed to flow through the phase leg 120:2, thus causing the unidirectional switches 11 of valves 105c and 105d to fail into a short circuit mode, as indicated by the bold lines. A permanent current path between the cell terminals X and Y have been created, wherein current can pass from terminal X to terminal Y through diode 12 of valve 105a and short-circuited unidirectional switch 11 of valve 105c. From terminal Y to terminal X, current can pass through short circuited unidirectional switch 11 of valve 105d, and through diode 12 of valve 105b. If, in the scenario of FIG. 4b, the faulty valve 105a is faulty because its unidirectional switch 11 has gone into a short circuit, then current from terminal Y to terminal X could alternatively go via valves 105c and 105a.

Figure 4C:
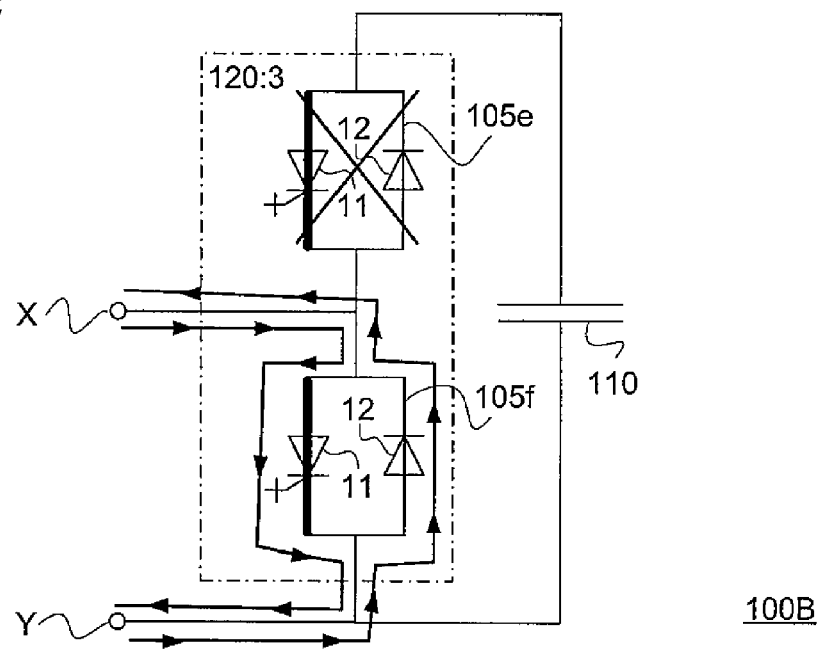
FIG. 4C-4D illustrate the effects of short-circuiting the cell capacitor through the cell phase leg of a half-bridge converter cell of the type shown in FIGS. 1b and 1c, respectively.
Figure 4D:
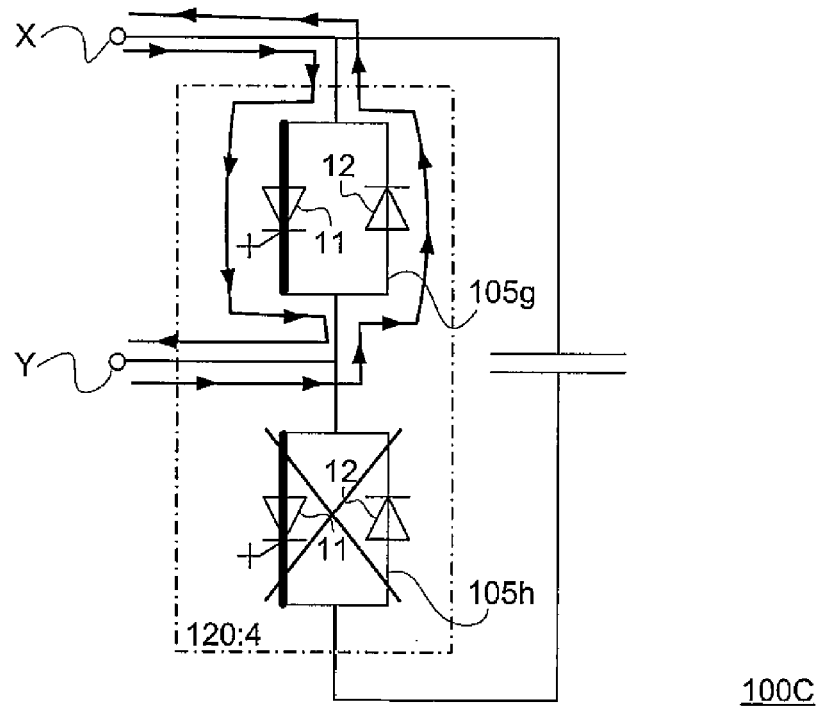

FIG. 4c illustrates the result of a short-circuiting operation on a half-bridge converter cell 100B wherein a fault has been detected at the valve 105e, which is the valve connected to only one cell terminal, terminal X. The valves 105e and 105f of phase leg 120:3 have been turned on at the same time so that a current discharge from the cell capacitor 110 was allowed to flow through the phase leg 120:3, thus causing the unidirectional switches 11 of valves 105e and 105f to fail into a short circuit mode, as indicated by the bold lines. As indicated in the figure, a current path between the cell terminals X and Y have been created, wherein current can pass for example from terminal X to terminal Y through short circuited unidirectional switch 11 of valve 105f, and from terminal Y to terminal X, through diode 12 of valve 105f. FIG. 4d illustrates the corresponding case for a converter cell 100C, where it has been detected that valve 105h was faulty.

In the scenarios shown in FIGS. 4a, 4c and 4d above, wherein the faulty valve 105 forms a part of the phase leg 120 through which a permanent current path is created by short circuiting of the cell capacitor 110, it would not have been necessary to turn on the unidirectional switch 11 of the faulty valve 105 if the fault is identified as a short circuit of the unidirectional switch 11. It would then have been sufficient to turn on the unidirectional switch 11 of the non-faulty valve 105 of the phase leg 120. However, in order to ensure that a permanent current path is created through the unidirectional switch 11 of the faulty valve 105, the switch 11 of the faulty valve 105 could also be given an instruction to turn on.

If, in a half-bridge converter cell 100B (100C), a fault is detected in the valve 105f (105g) which is connected between cell terminals X and Y, and the fault is identified as a short circuit of the unidirectional switch 11 of valve 105*f* (105*g*), then no short-circuiting operation would in principle be required. However, in order to ensure that a permanent current path is created through the unidirectional switch 11 of the faulty valve 105*f* (105*g*), the unidirectional switch 11 of the non-faulty valve 105*e* (105*h*) could be turned on to release the energy stored in cell capacitor 110. If desired, the unidirectional switch 11 of the faulty valve 105*f* (105*g*) could be instructed to turn on at the same time, in order to ensure an open path through this switch.

If one or both of the diodes 12 of a phase leg 120, which is short circuited in a short-circuiting operation as described above, will also fail into a permanent short-circuited state as a result of the current surge, this will not prevent the by-passing of the cell, but will rather yield alternative paths for the current.

Figure 5:
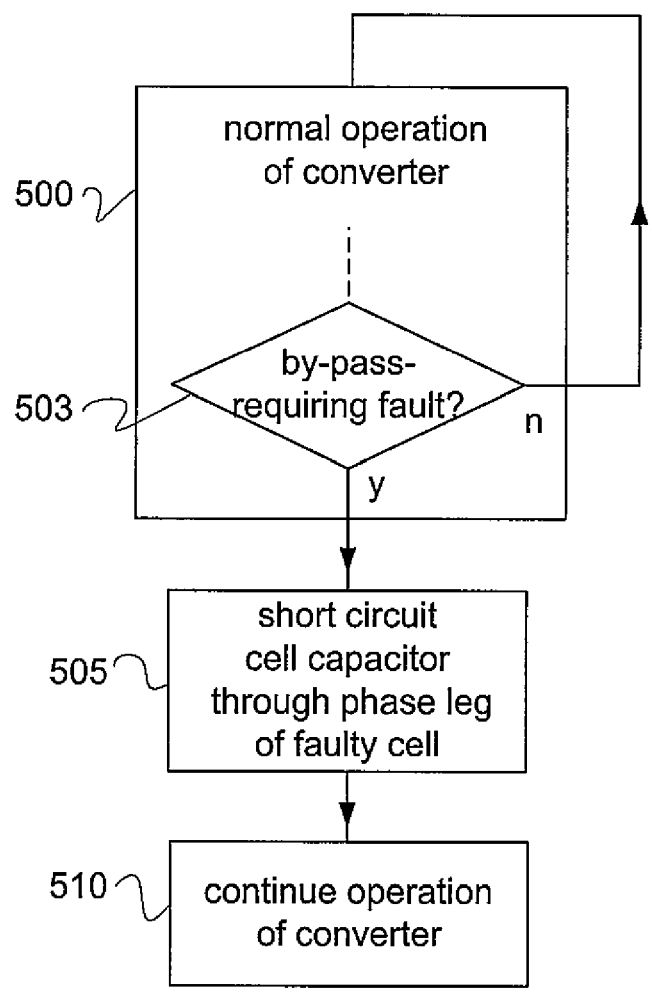
FIG. 5 is a flowchart schematically illustrating an embodiment of a method of operating a control system for controlling a cascaded converter.

FIG. 5 shows a flowchart which schematically illustrates an embodiment of a method of operating a cascaded converter 300. In step 500, the cascaded converter 300 is controlled in normal operation, for example in a conventional manner (see e.g. DE10103031 or Fang Zheng Peng, Jih-Sheng Lai, McKeever, J. W., VanCoevering, J., "*A multilevel voltage-source inverter with separate DC sources for static VAR generation*", IEEE Transactions on Industry Applications, Volume 32, Issue 5, pp 1130-1138, September/October 1996). During normal operation of the cascaded converter 300, it is checked, in step 503, whether a by-pass requiring fault has occurred in any of the converter cells 100 of the cascaded converter 300. Step 503 can for example be part of continuous monitoring of the status of the cascaded converter 300. If no fault has occurred which requires the by-passing of a converter cell 100, then the normal operation of step 500 is continued. However, if a fault has been detected which requires that a converter cell 100 is by-passed, then step 505 is entered, wherein the cell capacitor 110 is short-circuited through a phase leg 120 of the faulty converter cell 100, in order to create a current surge through the phase leg 120. Step 510 is then entered, wherein the operation of the converter 300 is continued, now with one less operating converter cell 100.

The decision to enter step 505 could be taken immediately after a faulty converter cell 100 has been detected, or the decision could be delayed until further analysis of the fault confirms that by-passing of the converter cell 100 is required, so as to avoid that the constructive short-circuiting of a phase leg 120 is unnecessarily triggered.

Figure 6A:
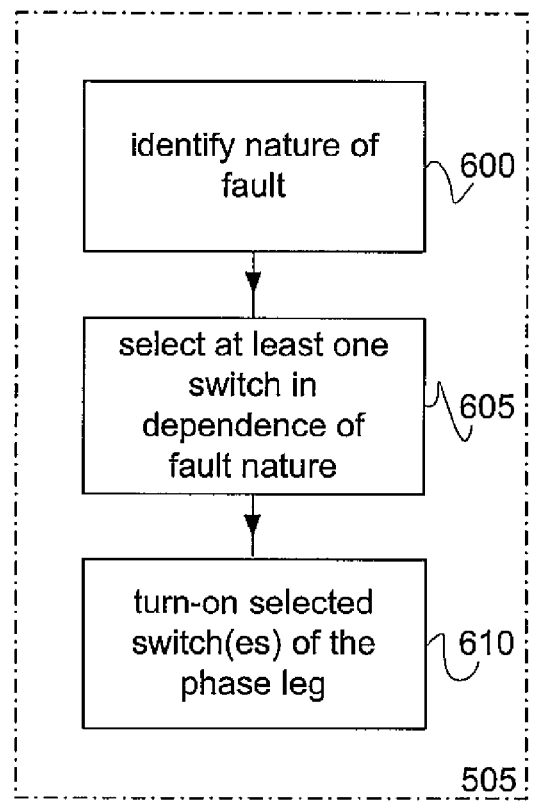
FIG. 6A-6B are flowchart illustrating different embodiments of a short-circuiting step of the flowchart of FIG. 5.

FIG. 6*a* is an illustration of an embodiment of step 505, wherein at least one unidirectional switch 11, to be turned on in order to create the desired permanent short circuit, is selected, based on the nature of the fault detected in step 503 of FIG. 5. In step 600, the nature of the fault detected in step 503 is identified. Faulty operation of a converter cell 100 could for example be caused by a short-circuited switch 11 of a valve 105; by a faulty gate drive unit 125 which is incapable of turning on and/or off a valve 105; by a valve 105 having failed into an open circuit, etc. When the nature of the fault has been identified, step 605 is entered, wherein at least one switch 11 is selected to be turned on in order to short circuit the cell capacitor 110 through a phase leg 120. In case the fault is caused by a switch 11 being short-circuited, the other switch 11 of the same phase leg 120 as the faulty switch 11 could be the only switch 11 selected to be turned on in step 605. Alternatively, both switches 11 of the faulty phase leg 120 could be selected. In case of a full-bridge converter cell 100A, both switches 11 of the non-faulty phase leg 11 could alternatively be selected to be turned on. In step 610, the switch(es) selected in step 605 are turned-on, typically by initiating the sending of a turn-on signal to each of the selected switches from corresponding gate drive units 125.

In case it is found in step 600 that the detected fault is caused by a faulty gate drive unit 125, two switches of the same phase leg 120 could advantageously be selected to be turned on in step 605. Since a faulty gate drive unit 125 may not be capable of turning on the switch 11 which it is configured to control, it may, in case of a full-bridge converter cell 100A, be advantageous to select the two switches 11 of the phase leg 120 which does not contain the switch 11 which is controlled by the faulty gate drive unit 125.

Figure 6B:
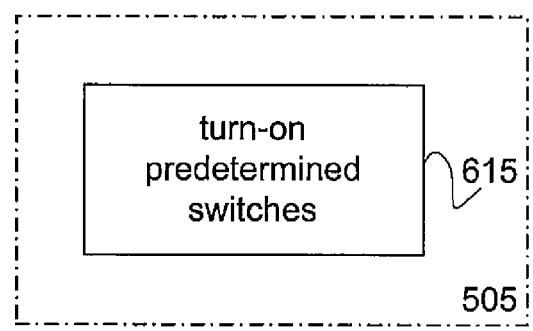

Another embodiment of step 505 is illustrated in FIG. 6*b*. Here, no selection step 605 is taken. Instead, the detection of a major fault in step 505 will trigger the turning on of a predetermined set of switches 11 of a converter cell 100 in step 615. In a half-bridge converter cell 100B/C, the predetermined set of switches will be the two switches of the phase leg 120:3/120:4. In a full-bridge converter cell 100A, the predetermined set of switches could be the two switches 11 of either phase leg 120:1 or 120:2, or all four switches 11.

In an implementation of a control system 135 wherein control system 135 is equipped with an interlock system which prevents the two switches 11 of a phase leg 120 to be switched on at the same time, step 505 could for example involve eliminating such interlock system.

Depending on the heat resistant properties of the components of a phase leg 120, and the magnitude of the voltage Uc over the cell capacitor 110, there may be a risk that the current surge created upon short-circuiting of a cell capacitor 110 through a phase leg 120 will result in a too rapid heating of the components, possibly causing undesired damage to the converter cell 100. In one embodiment, a reactor is introduced in the circuit of a converter cell 100 in order to limit the time derivative of the current surge, thereby limiting the peak current and reducing the risk of undesired damage. This may for example be useful when the unidirectional switches are semiconducting devices in disc type package comprising a semiconducting wafer where the current, if entered too rapidly into the device, will be concentrated to a small area of the device, which will then be rapidly heated.

Figure 7A:
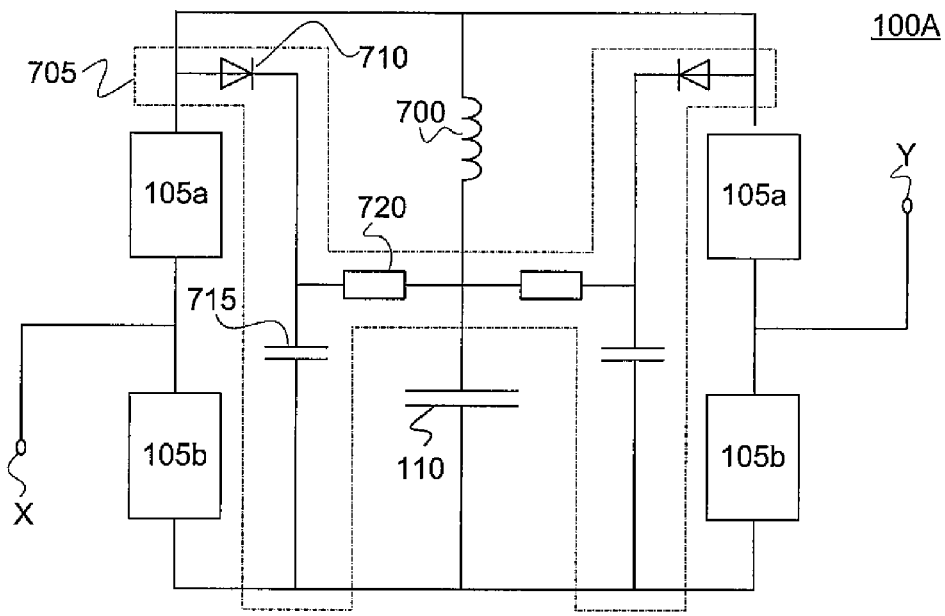
FIG. 7A illustrates an example of a full-bridge converter cell comprising a reactor for current slope limitation, as well as a clamping circuit.

FIG. 7*a* is an illustration of an embodiment of a full-bridge converter cell 100A comprising a reactor 700 for current slope limitation purposes. The location of the reactor 700 in the circuit of converter cell 100A in this embodiment is such that the reactor is connected in the path connecting the cell capacitor 110 to the phase legs 120:1 and 120:2. The reactor 700 of FIG. 7*a* is connected in the DC link between the cell capacitor 110 and the connection point of the positive terminals of the phase legs 120:1 and 120:2. Alternative locations of the reactor 700 could also be employed: The reactor 700 could for example be located in the DC link on the other side of the cell capacitor 110, i.e. between the cell capacitor 700 and the connection point of the negative terminals of the phase legs 120:1 and 120:2, or could be connected as at least two reactor parts, where at least one reactor part is connected between each of the phase legs 120 and the point where the cell capacitor 110 connects to the phase legs 120.

The converter cell 100A of FIG. 7*a* has further been equipped with a clamping circuit 705. The purpose of such clamping circuit 705 is to reduce or avoid any over voltage across a valve 105 upon commutation of the current from the valve 105 to another valve 105 during normal operation, such voltage originating from an inductive voltage across the reactor 700. The clamping circuit 705 of FIG. 7*a* exhibits reflection symmetry around the DC link wherein the cell capacitor 110 is connected and comprises, on either side of the DC link, a diode 710, a capacitor 715 and a resistor 720, referred to as clamping diode 710, clamping capacitor 715 and clamping resistor 720, respectively. The clamping circuit 705 is arranged to provide an alternative path for the current driven by the voltage across the reactor 700 induced by the current change when a valve 105a has been switched off, so that an over voltage across the switched-off valve 105 can be avoided. A clamping diode 710 and a clamping capacitor 715 are connected in a series connection, which in turn is connected in parallel with a phase leg 120, thus providing damping of a current which can no longer enter a closed valve 105. The clamping resistor 720 is connected at one end to a point between the clamping diode 710 and the clamping capacitor 715, the other end being connected to a point between the cell capacitor 110 and the reactor 700, so as to provide a possibility of discharging the clamping capacitor 715.

Figure 7B:
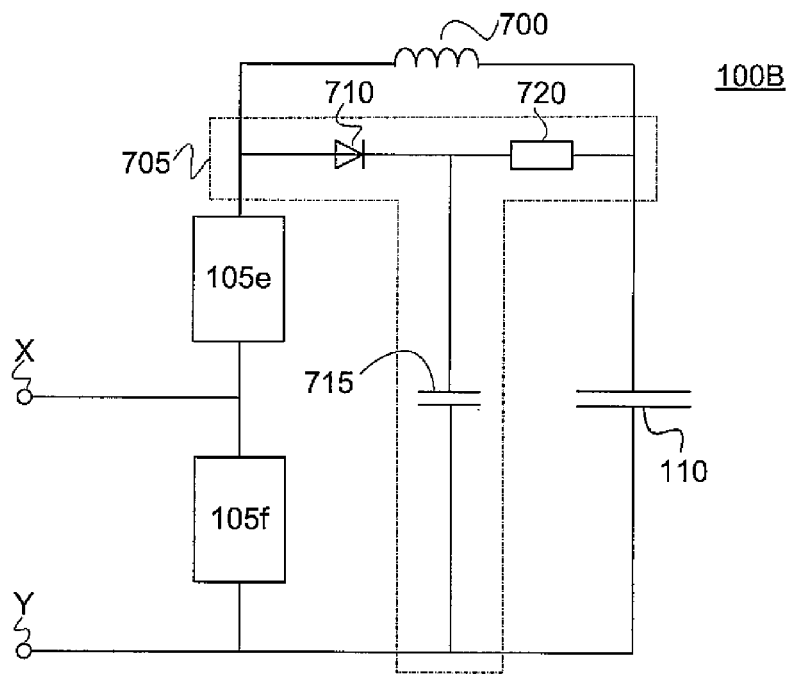
FIG. 7B illustrates an example of a half-bridge converter cell comprising a reactor for current slope limitation, as well as a clamping circuit.

FIG. 7b illustrates an embodiment of a half-bridge converter cell 100B wherein a reactor 700 has been connected in series between the cell capacitor 110 and the connection point of the positive terminals of phase leg 120:3 formed of valves 105e and 105f. Alternatively, the reactor 700 could be connected between the cell capacitor 110 and the connection point of the negative terminals of the phase leg 120:3.

The converter cell 100B of FIG. 7b further comprises a clamping circuit 705 including a clamping diode 710, a clamping capacitor 715 and a clamping resistor 720. The clamping diode and the clamping capacitor 715 are connected in a series connection which in turn is connected in parallel with phase leg 120. One end of clamping resistor 720 is connected to a point between the clamping diode 710 and the clamping capacitor 715, the other end being connected to a point between the cell capacitor 110 and the reactor 700.

An analogue clamping circuit configuration to the one shown in FIG. 7b could be used in a converter cell 100C.

Other configurations of the clamping circuit 705 providing alternative paths for the induced current may alternatively be used. For example, a clamping diode 710 and a clamping capacitor 715 could be connected in parallel with each valve 105 of a phase leg 120. The clamping circuits 705 of FIGS. 7a and 7b provide clamping of the reactance 700 in the embodiment wherein a converter cell 100 comprises a current slope limiting reactor 700. However, the clamping circuit 700 can optionally be omitted.

The reactance $L_{700}$ of a reactor 700 used for current slope limitation should preferably be high enough to yield a current time derivative, upon short circuiting of the cell capacitor 110, that is low enough for the current to be evenly distributed over the cross section of the switches 11 of the short-circuited phase leg 120, thus avoiding local heating within the switches 11 that may otherwise cause undesired damage. Furthermore, the reactance $L_{700}$ should preferably be low enough to yield a current time derivative that is high enough for the current through the phase leg 120 to grow to a magnitude at which the switches 11 will go into short circuit mode. In one implementation, the ratio of the reactance $L_{700}$ to the capacitance of the cell capacitor, $C_{110}$, is of the following magnitude:

$$\frac{L_{700}}{C_{110}} \sim \left(\frac{U_{110}}{a \cdot I_{nom}}\right)^2, \quad (1)$$

where $U_{110}$ is the nominal voltage across the cell capacitor 110, $I_{nom}$ is the nominal operating current of the converter cell 100, and a is a constant that could for example lie in the range of 50-200—as an example, a could take the value 100. Other ratios between the reactance $L_{700}$ of reactor 700 and the capacitance $C_{110}$ of the cell capacitor 110 could also be used.

In one example of a converter cell 100 having a clamping circuit 705, the nominal voltage across the cell capacitance takes the value $U_{110}$=2 800 V, the nominal operating current takes the value $I_{nom}$=2 000 A, the capacitance of the cell capacitor 110 takes the value $C_{110}$=20 mF, and the reactance of the reactor 700 takes the value $L_{700}$=5 µH. These values are given as an example only, and $U_{110}$, $I_{nom}$, $C_{110}$ etc. can take any desired value.

The operation of a cascaded converter 300 is typically monitored by the control system 135 in order to allow for efficient switching of the switches 11, as well as in order to detect any failing parts of the cascaded converter 300. Such monitoring could for example include monitoring the voltage across the phase legs 120 of the converter cells 100. During commutation of current, no voltage is typically expected over a phase leg 120. If the voltage across the phase leg 120 remains at zero level when a certain period of time (e.g. in the order of 10-100 µs) has elapsed since the start of commutation, it can be assumed that the phase leg 120 is short circuited. If the voltage across the phase leg 120 does not go to zero upon commutation, it can be assumed that the gate drive unit 125, which has been instructed to turn on a valve 105 in order to execute the commutation, is incapable of turning on and/or off the valve 105. Hence, by means of a voltage measurement device configured to measure the voltage across the phase legs 120 and to deliver a signal indicative of such measurements to the control system 135 (cf. signals 140 of FIGS. 1a-c), control system 135 can obtain information by means of which valve failure may be detected. From such measurements, it may furthermore be deduced whether a failed valve 105 has failed in an open or a closed mode.

Monitoring of the operation of a power converter could alternatively, or additionally, include the monitoring of the voltage across individual valves 105. A valve failure indication can for example be obtained if the measured voltage across a valve 105 does not correspond to the expected voltage across the valve 105 in the current switching state.

Another example of a measurement which may provide the control system 135 with failure related information is measurements of the power supplied to the gate drive units 125. If a gate drive unit 125 lacks sufficient power, it may not be able to provide an efficient switching signal, and the switch 11 that it serves may therefore not behave in the expected manner, although the switch 11 itself is not faulty. Furthermore, the gate drive unit 125 could have built-in fault detection for detecting different types of faults occurring in the gate drive unit 125. Other ways of detecting converter cell faults may also be employed.

A decision to by-pass a faulty converter cell 135 of a converter 300 may be taken by the control system 135 within milliseconds, or shorter, of having detected a major fault requiring the by-passing of the converter cell 100. The short-circuiting of a phase leg 120 by means of the energy stored in the cell capacitor 110 provides a quick and efficient way of by-passing the cell, since no mechanical operation is needed. However, if the short-circuiting of the phase leg 120 for some reason has not been performed upon discharging of the cell capacitor 110, the cell capacitor 110 can be re-charged, for example by turning off all switches 11 of the converter cell 100. When the cell capacitor 110 has been re-charged, the short-circuiting action of can be performed (cf. step 505 of FIG. 5).

Figure 8:
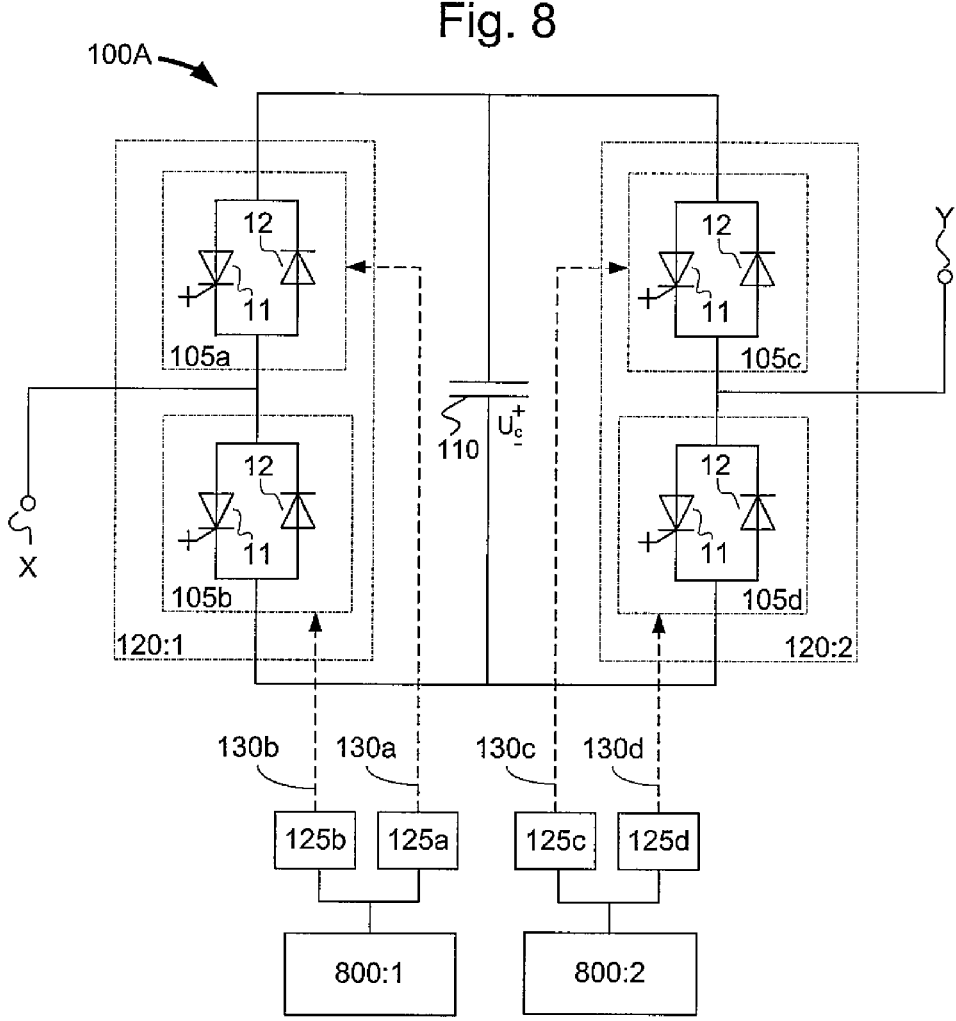
FIG. 8 illustrates an example of a full-bridge converter cell wherein the phase legs are provided with separate power supply systems.

The phase legs 120:1 and 120:2 of a full-bridge converter cell 100A could be provided with separate power supply systems, as shown in FIG. 8. By providing two separate power supply systems, it can be ensured that the valves of at least one phase leg 120 can be controlled to short circuit the cell capacitor 120, if need arises, even if one of the power supplies fails. Full-bridge converter cell 100A of FIG. 8 comprises two separate power supply systems 800:1 and 800:2. Power supply system 800:1 is connected to gate drive units 125a and 125b, which are arranged to supply switching signals 130a and 130b to switches 11 of valves 105a and 105b of phase leg 120:1, while power supply system 800:2 is connected to gate drive units 125a and 125b, which are arranged to supply switching signals 130c and 130d to switches 11 of valves 105c and 105d of phase leg 120:2. Thus, if power supply system 800:1 fails, short-circuiting signals could still be generated to the switches 11 of phase leg 120:2, and if power supply system 800:2 fails, short-circuiting signals to switches 11 of phase leg 120:1 could still be generated. A power supply system 800 could for example be connected to the cell capacitor 110 for supply of power. Power supply systems 800:1 and 800:2 could be independently connected to the cell capacitor 110 for separate supply of power. In another implementation, the power supply systems 800:1 and 800:2 are connected to the valves 105 of the phase legs 120:1 and 120:2, respectively. The power provided by a power supply system 800 can then be received from the turned off valve 105 of the phase leg 120 which is served by the gate drive unit 125 to which power is provided. A power supply system 800 could for example include a DC/DC converter for providing galvanic separation and voltage adaptation. The operating voltage of a power supply system 800 could for example be in the range of 15-24 V, while the operating voltage of a cell capacitor 110 would typically be considerably higher—for example in the range of 1 600-2 800 V.

Figure 9:
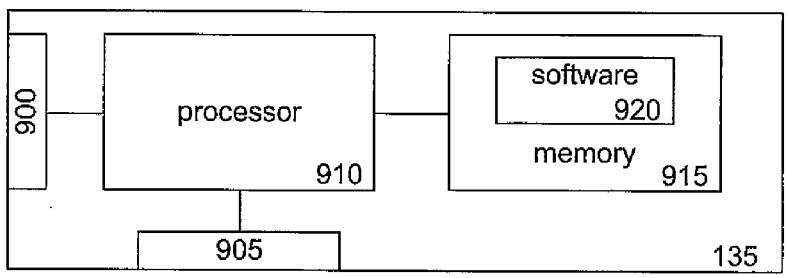
FIG. 9 illustrates an embodiment of a control system configured to control the switching of the valves of the converter cell.

The method of FIG. 5, of which embodiments are shown in FIGS. 6a and 6b, could for example be performed in a control system 135, which may be implemented by means of a suitable combination of hardware and software. Hence, control system 135 could, in one embodiment, be programmably configured to perform the short-circuiting operation discussed above. An illustration is shown in FIG. 9 of a control system 135 comprising an input 900 configured to receive status signals 140, an output 905 configured to deliver switching instructions, processing means 910 and a memory 915. Memory 915 stores computer program code 920 which, when executed on the processing means 910, would perform the method of FIG. 5. Processing means 910 could be one or more processors. In one embodiment of control system 135, the control system 135 comprises a number of sub-units, each controlling a set of one or more converter cells 100, as well as a central control system with which the sub-units can communicate. In another embodiment, the control system 135 comprises a central control system only, which controls the operation of all the converter cells 100 of a converter 300. In one embodiment, the control system 135 is implemented by means of hardware only.

In the above discussion, for illustrative purposes, each phase leg 120 has been shown to have two series connected electric valves 105, where each valve 105 connects one of the DC rails to the midpoint of the phase leg 120. However, the disclosed technology is also applicable to configurations wherein a phase leg 120 comprises more than two electric valves 105, which are configured so that a converter cell 100 can take different switching states. When short-circuiting the cell capacitor 110 of converter cell 100 through a phase leg 120 having more than two valves 105, at least two series connected valves 105 of the phase leg 120 will be switched on at the same time so that a current path through the phase leg 120 via the cell capacitor 100 is created.

The above discussed technology provides an efficient and hardware economical way to obtain redundancy in a voltage source, self-commutating, cascaded power converter 300 for use in power applications such as HVDC and static VAR compensation. Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

What is claimed is:

1. A cascaded electric power converter comprising:
   a converter cell including a cell capacitor and at least one phase leg having at least two electric valves, the at least one phase leg being connected in parallel to the cell capacitor, the at least two electric valves each having a unidirectional switch, the converter cell further comprising a clamping circuit connected so as to limit voltage across the valves while switching off the valves;
   a control system for controlling switching of the electric valves of the at least one phase leg, the control system being configured to, upon detection of a need to by-pass the converter cell, control the switching of the electric valves of the converter cell by turning on the unidirectional switch of each of the at least two electric valves at the same time, so that the cell capacitor is short circuited via the at least one phase leg, so as to obtain a current surge through the at least one phase leg, thereby creating a permanent current path through the at least one phase leg to by-pass the converter cell; and
   a reactor connected in series between the cell capacitor and the at least one phase leg in order to limit peak current upon short-circuiting of the cell capacitor.

2. The converter of claim 1, wherein
   the converter cell is a full-bridge converter cell comprising two phase legs arranged in a full bridge.

3. The converter of claim 2, wherein the converter cell further comprises:
   a first power supply unit and a second power supply unit configured to supply power to the switching of the electric valves, wherein
   the first power supply unit is configured to supply power to the switching of the electric valves of a first phase leg and the second power supply unit is configured to supply power to the switching of the electric valves of a second phase leg, and
   wherein the first and second power supply units are independent of each other.

4. The converter of claim 1, wherein the control system is configured to:
   receive at least one status signal indicative of a status of the converter cell; and
   upon detection of a need to by-pass the converter cell and in dependence of the at least one received status signal:
     select at least one electric valve to be turned on, wherein the selection is performed in a manner so that the turning on of the at least one selected electric valve will create a path through the phase leg by which the cell capacitor will be short-circuited; and
     generate a signal to the at least one selected electric valve to switch into a turned on state in order to short circuit the cell capacitor.

5. The converter of claim 1, wherein the control system is configured to, upon detection of a need to by-pass the converter cell, generate a signal to a pre-determined set of electric valve(s) which, when turned on, will create a path through the phase leg by which the cell capacitor will be short-circuited.

6. The converter of claim 1, wherein each of the at least two electric valves includes an anti-parallel diode.

7. The converter of claim 1, wherein the at least two electric valves are able to block voltage in the same direction.

8. The converter of claim 1, further comprising a cell terminal at a midpoint of the at least one phase leg.

9. The converter of claim 1, further comprising at least one gate drive unit.

10. The converter of claim 9, wherein the at least one gate drive unit is configured to deliver switching signals to the at least two electric valves.

11. The converter of claim 9, wherein the at least one gate drive unit is connected to the cell capacitor and is configured as a power source.

12. The converter of claim 1, wherein the converter cell further comprises: a reactor located in a DC link between the cell capacitor and at least one phase leg.

13. The converter of claim 1, wherein the clamping circuit includes a clamping diode, a clamping capacitor and a clamping resistor, wherein the clamping diode and the clamping capacitor are connected in series.

14. The converter of claim 1, wherein the converter cell is a faulty converter cell.

15. A static var compensator station comprising a cascaded converter which includes
- a converter cell including a cell capacitor and at least one phase leg having at least two electric valves, the at least one phase leg being connected in parallel to the cell capacitor, the at least two electric valves each having a unidirectional switch, the converter cell further comprising a clamping circuit connected so as to limit voltage across the valves while switching off the valves; and
- a control system for controlling switching of the electric valves of the at least one phase leg; and
- a reactor connected in series between the cell capacitor and the at least one phase leg in order to limit peak current upon short-circuiting of the cell capacitor,
- wherein the control system is configured to, upon detection of a need to by-pass the converter cell, control the switching of the electric valves of the converter cell by turning on the unidirectional switch of each of the at least two electric valves at the same time, so that the cell capacitor is short circuited via the at least one phase leg, so as to obtain a current surge through the at least one phase leg, thereby creating a permanent current path through the at least one phase leg.

16. A high-voltage direct current station comprising a cascaded converter which includes
- a converter cell including a cell capacitor and at least one phase leg having at least two electric valves, the at least one phase leg being connected in parallel to the cell capacitor, the at least two electric valves each having a unidirectional switch, the converter cell further comprising a clamping circuit connected so as to limit voltage across the valves while switching off the valves; and
- a control system for controlling switching of the electric valves of the at least one phase leg; wherein the control system is configured to, upon detection of a need to by-pass the converter cell, control the switching of the electric valves of the converter cell by turning on the unidirectional switch of each of the at least two electric valves at the same time, so that the cell capacitor is short circuited via the at least one phase leg, so as to obtain a current surge through the at least one phase leg, thereby creating a permanent current path through the at least one phase leg; and
- a reactor connected in series between the cell capacitor and the at least one phase leg in order to limit peak current upon short-circuiting of the cell capacitor.

17. A power transmission system comprising a cascaded converter which includes
- a converter cell including a cell capacitor and at least one phase leg having at least two electric valves, the at least one phase leg being connected in parallel to the cell capacitor, the at least two electric valves each having a unidirectional switch, the converter cell further comprising a clamping circuit connected so as to limit voltage across the valves while switching off the valves;
- a control system for controlling switching of the electric valves of the at least one phase leg; and
- a reactor connected in series between the cell capacitor and the at least one phase leg in order to limit peak current upon short-circuiting of the cell capacitor,
- wherein the control system is configured to, upon detection of a need to by-pass the converter cell, control the switching of the electric valves of the converter cell by turning on the unidirectional switch of each of the at least two electric valves at the same time, so that the cell capacitor is short circuited via the at least one phase leg, so as to obtain a current surge through the at least one phase leg, thereby creating a permanent current path through the at least one phase leg.

18. A method of by-passing a converter cell in a cascaded electric power converter including a cell capacitor and at least one phase leg connected in parallel to the cell capacitor, wherein the at least one phase leg has at least two series connected electric valves, the at least two electric valves each having a unidirectional switch, the converter cell further comprising a clamping circuit connected so as to limit voltage across the valves while switching off the valves, and a reactor connected in series between the cell capacitor and the at least one phase leg in order to limit peak current upon short-circuiting of the cell capacitor, the method comprising:
- controlling switching of the electric valves by turning on the unidirectional switch of each of the at least two electric valves at the same time, so that the cell capacitor is short circuited via the at least one phase leg, so as to obtain a current surge through the at least one phase leg, thereby creating a permanent current path through the at least one phase leg.

19. The method of claim 18, further comprising:
receiving at least one status signal indicative of a status of the converter cell; and
selecting, in dependence of the received at least one status signal, at least one electric valve to be turned on, wherein the selection is performed in a manner so that the turning on of the selected electric valve(s) will create a path through the at least one phase leg by which the cell capacitor will be short-circuited; and
wherein the short-circuiting comprises:
generating a signal to the selected electric valve(s) to switch into a turned on state in order to short circuit the cell capacitor.

20. The method of claim 18, wherein the short-circuiting comprises:
generating a signal to a pre-determined set of electric valve(s) which, when turned on, will create a path through the at least one phase leg by which the cell capacitor will be short-circuited.

* * * * *